United States Patent [19]

Miyasaka et al.

[11] Patent Number: 4,876,183

[45] Date of Patent: Oct. 24, 1989

[54] TUBULAR SILVER HALIDE PHOTOSENSITIVE MATERIALS SENSITIZED WITH A LUMINOUS DYE

[75] Inventors: Tsutomu Miyasaka; Masaki Okazaki; Tadao Sugimoto, all of Kanagawa, Japan

[73] Assignee: Fuji Photo Film Co., Ltd., Kanagawa, Japan

[21] Appl. No.: 127,139

[22] Filed: Dec. 1, 1987

[30] Foreign Application Priority Data

Dec. 1, 1986 [JP] Japan ................................. 61-284272

[51] Int. Cl.$^4$ ........................... G03C 1/12; G03C 1/28
[52] U.S. Cl. ..................................... 430/567; 430/139; 430/572; 430/573; 430/574; 430/570; 430/576
[58] Field of Search ............... 430/139, 570, 572, 573, 430/574, 576, 567

[56] References Cited

U.S. PATENT DOCUMENTS

| | | | |
|---|---|---|---|
| 3,622,316 | 11/1971 | Bird et al. ............................ | 430/574 |
| 4,040,825 | 8/1977 | Steiger et al. ........................ | 430/570 |
| 4,439,520 | 3/1984 | Krofron et al. ...................... | 430/570 |
| 4,520,098 | 5/1985 | Dickerson ............................ | 430/570 |
| 4,543,308 | 9/1985 | Schumann et al. ................. | 430/139 |

*Primary Examiner*—Richard L. Schilling
*Attorney, Agent, or Firm*—Sughrue, Mion, Zinn, Macpeak & Seas

[57] ABSTRACT

A silver halide photosensitive material comprising a support having thereon at least one silver halide emulsion layer comprising tabular grains whose diameter of an average projected area/average thickness ratio is 5/1 or higher is provided. Said emulsion layer contains one or more luminescent dyes whose luminescence quantum yield is 0.3 or more when its concentration is dry gelatin is $10^{-4}$ mol/dm$^3$ at room temperature and that can be substantially removed by development processing, and the content of said luminescent dye is 3.0 $\mu$mol/m$^2$ or more for the total surface area of the silver halide grains in said emulsion layer, or is 2.0 mmol/dm$^3$ or more in a hydrophilic dispersion medium excluding the silver halide grain surfaces in said emulsion layer.

16 Claims, No Drawings

TUBULAR SILVER HALIDE PHOTOSENSITIVE MATERIALS SENSITIZED WITH A LUMINOUS DYE

FIELD OF THE INVENTION

The present invention relates to silver halide photosensitive materials spectrally sensitized with a dye and particularly to silver halide photosensitive materials containing a tabular silver halide grain emulsion. The present invention is directed to a basic technique of spectral sensitization generally related to silver halide photosensitive materials that use tabular grains and is applicable in the filed of all silver halide photo-sensitive materials including black and white systems, color systems, and color diffusion transfer systems irrespective of a negative system, a positive system or a reversal system.

BACKGROUND OF THE INVENTION

Methods of spectrally sensitizing silver halides with dyes are a known technique, and as practicable sensitizing dyes, methine type dyes having adsorbability such as cyanine, merocyanine, composite cyanines and composite merocyanines are widely used. These dyes are used to enlarge the wavelength range of color sensitization and are in some cases supersensitized. Generally it is known that these spectral sensitizinig dyes are adsorbed on silver halide grain surfaces to take part in sensitization. Thererfore, the larger the adsorption effective surface area per grain of a silver halide, the larger the light absorption quantity of the adsorbed sensitizing dye, which increases the spectrally sensitized sensitivity. In this respect, tabular silver halide grains having a large surface area/volume ratio are advantageous to give a high spectral sensitivity in comparison to cubic, octahedral, or sperical grains, and therefore the tabular silver halide grains are considered advantageous to provide an emulsion that is highly sensitized with a dye. Particularly, since silver bromoiodide tabular emulsions are preferable from a practical viewpoint in that the intrinsic sensitivity is high, various dye sensitizations and supersensitizations thereof have been studied. That is described in detail, e.g., in *Research Disclosure*, RD No.22534 (Jan. 1983) and Japanese patent application (OPI) Nos. 113926/83 and 113927/83 (the term "OPI" as used herein refers to a "published unexamined Japanese Patent Application).

On the other hand, there is a limit on the quantity of a spectral sensitizing dye to be adsorbed onto emulsion grain surfaces, and it is well known that when saturated adsorption or adsorption near to saturation is established, remarkable desensitization (intrinsic desensitization) often takes place (see, for example, Photog. Sci. Eng. by W. C. Lewis, et al., Vol. 13, page 54, 1969, and U.S. Pat. No. 3,979,213) and that the optimum amount of a sensitizing dye to be added is that amount generally corresponding to about 25 to 100% of the surface covering rate of the grains (see *Theory of the Photographic Process*, by K. Mees, 1942 Macmillan, page 1067). This also applies to tabular emulsions (see Japanese patent application (OPI) No. 113926/84), and the situation is such that the rate of use of incident light is still quite low.

Further, since grains of tabular emulsions have large specific surface areas, an increase in sensitivity by color sensitization, that is, the ratio of the minus blue sensitivity to the blue sensitivity (intrinsic sensitivity), is high, so that although tabular emulsions are advantageous when a green sensitive layer or a red sensitive layer is to be highly sensitized, the sensitivity of a blue sensitive layer, in comparison to that of the green sensitive layer or the red sensitive layer, is relatively low, which results in color imbalance. This is described in Japanese patent application (OPI) Nos. 113927/83, 113930/83, and 113934/83 wherein it is pointed out that since the blue sensitivity is low, it is not required to provide yellow filters for the green sensitive emulsion layer and the red sensitive emulsion layer, both layers being applied on a color sensitive material. The same problem occurs in cases using panchromatic black and white photosensitive materials whose tabular emulsion is sensitized in the range of from blue to red. That is, in these cases, it is required to add a blue sensitive dye to improve blue sensitivity, whereas, due to a limit to the dye adsorption amount, this inevitably reduce the sensitizing dye for minus blue sensitization, and, as a result it becomes difficult to retain the minus blue sensitivity at a high enough value.

SUMMARY OF THE INVENTION

One object of the invention is to provide silver halide photosensitive materials which are significantly improved in spectral sensitivity of the tabular grains without causing dye desensitization even if the amount of dye added to the silver halide grains is increased to an amount greater than the amount corresponding to that necessary to cover the surface area of the grains.

Another object of the invention is to provide silver halide photosensitive materials containing tabular grains that have a high green sensitivity and/or a high red sensitivity sensitized with a dye as well as an equally highly sensitized blue sensitivity.

Still another object of the invention is to provide silver halide photosensitive materials wherein even when a sensitizing dye is added in excess, any desensitizing factor of, for example, conspicuous intrinsic desensitization or development restraint would not be involved, and the excess dye can be completely discolored by conventional development processing, thereby resulting in elimination of residual color due to such dye, so that good photographic images can be provided.

These objects of the present invention have been attained by providing a silver halide photosensitive material comprising a support having thereon at lease one silver halide emulsion layer comprising tabular grains whose diameter of an average projected area/average thickness ratio is 5/1 or higher, wherein said emulsion layer contains one or more luminescent dyes whose luminescence quantum yield is 0.3 or more when its concentration is dry gelatin is $10^{-4}$ mol/dm$^3$ at room temperature and that can be substantially removed by development processing, and the content of said luminescent dye is 3.0 $\mu$mol/m$^2$ or more of the total surface area of the silver halide grains in said emulsion layer, or is 2.0 mmol/dm$^3$ or more in a hydrophilic dispersion medium excluding the silver halide grain surfaces in said emulsion layer. The term "diameter(s)" herein signifies the diameter of circle having the same area as the projection area of the grain which is determined by observation under a microscope or an electron microscope.

DETAILED DESCRIPTION OF THE INVENTION

The present invention can attain the above objects only by incorporating a luminescent dye into a tabular grain emulsion layer and performs effective sensitization by amply absorbing light incident to the photosensitive emulsion layer and usefully transferring the absorbed excitation energy to the photosensitive silver halide grains. In this regard, the present invention is substantially different from cases using usual so-called anti-irradiation dyes or antihalation dyes. The major process assuming the transmission of the light energy from the luminescent dye to the photosensitive silver halide grains is the energy transmission between the dye molecules, and the excited energy is transmitted via so-called Förster-type mechanism (*Disc. Faraday Soc.*, Vol. 27, page 7, 1959) to be concentrated in the photosensitive center. Therefore, it is desirable that the overlap of the emission band and the absorption band in the luminescent dye itself is wider. Thus, since the present luminescent dyes collect the energy of the absorbed light onto photosensitive grains, the present luminescent dyes can be called light-harvesting dyes.

Although it is required that the luminescence quantum yield of luminescent dyes used in the present invention (hereinafter also referred to as light-harvesting dyes) is 0.3 or more when the concentration of the dye in a dry gelatin medium is $10^{-4}$ mol/dm$^3$ at room temperature, preferably the luminescence quantum yield is 0.5 or more, and more preferably 0.7 or more.

The luminescence quantum yield of light-harvesting dyes in a dry film can be measured by the same method basically as the method of measuring the luminescence quantum yield of solutions and generally can be determined relatively by using as a reference a standard sample whose absolute quantum yield is known (e.g., Rhodamine B, quinine sulfate and 9,10-diphenylanthracene) and comparing the incident light intensity, the light absorption rate of the sample and the luminescence intensity of the sample with those of the reference under a certain optical arrangement. This relative determination method is shown, for example, by C. A. Parker and W. T. Rees in *Analyst*, Vol. 85, page 587 (1960).

Therefore, the luminescence quantum yield of light-harvesting dyes in dry gelatin defined in the present invention can be found simply by carrying out the above relative determination method using as a reference a gelatin dry film (a sample in the form of a sheet) wherein a standard luminescent dye is dispersed in an arbitrary concentration and the absolute quantum yield is known.

The inventors have determined the absolute luminescemce quantum yield of a standard sample in a dry film in the following manner.

The Method of Determining the Absolute Luminescence Quantum Yield of a Standard Sample As a standard dye, fluorescent N-phenyl-1-naphthylamine-8-sulfonic acid that is free from contribution of reabsorption due to the overlap of the absorption band and the emission band was selected, and gelatin containing said acid was uniformly applied to a transparent support followed by drying so that a standard sample might be produced wherein the dye concentration in the dry film was $10^{-2}$ mol/dm$^3$ and the amount of the applied gelatin was 6 g/m$^2$. Then, the sample was set in a integrating sphere whose inner wall was coated with a white powder (BaSo$_4$), a monochromatic excitation light of 380 nm is allowed to strike the sample, and the intensity of the excitation light and the intensity of the fluorescent light were detected by a photoelectric multiplier attached to a window of the integrating sphere. At that time, the light absorption rate A of the sample was measured by mounting a fluorescence cutting filter to the photoelectric multiplier to determine the intensity of the excitation light in one case wherein the sample was set and in the other case wherein the sample was not set. On the other hand, regarding the fluorescence component from the sample, the fluorescence integrated intensity F' was measured by mounting an excitation light cutting filter instead. After the fluorescence integrated intensity F' and the incident monochromatic light intensity I' measured in the same determining system without the sample and the filter were converted into the form of true relative photon numbers F and I based upon the spectral transmittance of the excitation light cutting filter, the effective spectral reflectance of the integrating sphere, the spectral sensitivity of the photoelectric multiplier, etc., the absolute luminous yield was calculated from F/(I.A).

In the present invention, in view of the transmission of energy, preferable luminescent dyes capable of giving a light-gathering function are such dyes wherein the difference between the peak wavelengths of the absorption and emission, that is, the so-called Stokes shift, is small, and the overlap of the emission band and absorption band between the dye molecules is great. For the purpose of increasing the light-harvesting efficiency, the Stokes shift is preferably within 40 nm, more preferably within 20 nm, when the concentration of luminescent dyes in the gelatin dry film is $10^{-4}$ mol/dm$^3$ at room temperature.

Since luminescent dyes efficiently transfer energy to a sensitizing dye adsorbed directly on photosensitive silver halide grains, it is required that the luminescent band of the luminescent dye overlaps at least part of the absorption band of the adsorbed sensitizing dye.

Luminescent dyes (light-harvesting dyes) used in the present invention may be adsorbed partly on silver halide grains in an emulsion layer or may have a multilayer structure in which the luminescent dye is adsorbed on a sensitizing dye adsorbed directly on the grain surface. However, to attain the purpose of light-harvesting sensitization of the present invention, since generally a relatively large amount of a dye is required, it is preferable that the light-harvesting dye is highly soluble in water, is weak in adsorbability onto silver halide grains, and more preferably is substantially non-adsorbable. Herein, the terminology "substantially non-adsorbable" means that the amount of adsorption onto the outer surface of the {111} planes of silver bromide crystals is up to $5 \times 10^{-7}$ mol/m$^2$ at 40° C. and a pH of $6.5 \pm 0.05$ when the solution phase equilibrium concentration in a 5 wt. % aqueous gelatin is $10^{-4}$ mol/liter. the amount of adsorption of a dye can be found by adding the dye to an emulsion containing, for example, 5 wt. % of gelatin, stirring the mixture at 40° C. for 18 hours under a safety lamp, then settling the silver halide grains to be separated by centrifugal separation, and determining the concentration of the dye in the supernatant liquid. In the present invention, if all dyes involved in harvesting light are non-adsorbable, it is required that silver halide grains in at least one emulsion layer containing the light-harvesting dyes are sensitized with adsorbable spectral sensitizing dye.

Regarding the water-solubility of luminescent dyes, it is preferable that the luminescent dyes have a solubility of $10^{-2}$ mol/liter or more at 25° C. and a pH of 7.0. Such a water-solubility can be attained by having the dye contain, for example, 4 or more water-soluble groups per molecule. As water-soluble groups, sulfonic acid groups and carboxylic acid groups are particularly preferable, and if a dye has 4 or more such anionic hydrophilic groups, the dye is rendered highly water-soluble and becomes a dye substantially non-adsorbable onto silver halides, so that the dye can be solubilized and dispersed at a high concentration into a hydrophilic colloid of an emulsion layer and can be removed quickly and completely in a conventional development process step or quick development process step. Thus, light-harvesting dyes that are high in water-solubility and are substantially non-adsorbable are not necessarily limited to molecules having the above structure, but particularly preferable dyes are of cyanine type because the introduction of water-soluble groups is synthetically easy and the luminescence efficiency is excellent.

Although the absorption wavelength range of light-harvesting dyes of the invention is not limited specifically, when the dye is used in combination with blue region, panchromatic, and orthomatic sensitizing dyes that are generally used for black and white silver photosensitive materials and color silver photosensitive materials, it is preferable that the maximum absorption wavelength is in the range of from 420 nm to 740 nm, because it is preferable to provide an emission band overlapping the absorption band of the sensitizing dye in view of increasing the efficiency of the transmission of energy.

Preferably, the type of light-harvesting dyes of the present invention is of a cyanine dye series in view of the luminescence quantum yield and the Stokes shift as described above. Regarding cyanine series dyes, the luminescence yields of the dyes in solutions or other matrices have been reported, for example, by D. F. O'Brien in *Photo. Sci. Eng.*, Vol. 18, page 76 (9174), and a value of 0.75 is obtained by using oxacarbocyanine derivatives in gelatin. Examples of dyes high in luminescence quantum yield include those having a structure of dyes used for dye lasers. These are summarized by Mitsuo Maeda in *Study of Lasers* (Reza no Kenkyu), Vol. 8, pages 694, 803, and 958 (1980), and Vol. 9, page 85 (1981), and in *Dye Lasers*, edited by F. P. Schaefer Springer (1973). Although many of these are normally rather poor in water-solubility, they can be made into dyes amply soluble in water by introducing a plurality of sulfonic acid groups or carboxylic acid groups into the molecule, and therefore can be used as preferable light-harvesting sensitizing dyes for the present invention.

Typical examples of light-harvesting dyes useful in the present invention are identified below, but the invention is not limited thereto.

A. Water-soluble cyanine and water-soluble merocyanine type dyes.
B. Xanthene type dyes.
C. Acridine type dyes.
D. Oxazine type dyes.
E. Thiazine type dyes.
F. Riboflavin type dyes.
G. Triacetalmethane type dyes.
H. Aminonaphthalene type dyes.
I. Pyrene type dyes.
J. Coumarin type dyes.
K. Porphyrin type dyes.
L. Phthalocyanine type dyes.

Of these, particularly preferable dyes are the dye groups belonging to A and B, and most preferable dyes of group of A are those of non-adsorbable water-soluble cyanine type, and of dyes belonging to B, water-soluble derivatives of Rhodamines (e.g. Rhodamine B and sulforhodamine B) are preferable in view of high luminescent quantum yield.

Preferable specific examples of luminescent dyes used in the present invention are shown below, but the skeleton structure, the substituents, etc. are not limited thereto.

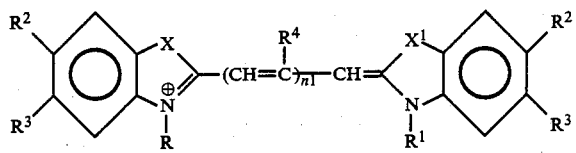

Formula (I)

| Compound No. | X | X¹ | R | R¹ | R² | R³ | R⁴ | n₁ |
|---|---|---|---|---|---|---|---|---|
| A-1 | O | O | $(CH_2)_4SO_3^\ominus$ | $(CH_2)_4SO_3Na$ | $CO_2Na$ | H | H | 1 |
| A-2 | O | O | " | " | $SO_3Na$ | H | H | 1 |
| A-3 | O | O | " | $(CH_2)_4SO_3K$ | H | Cl | H | 1 |
| A-4 | O | O | $(CH_2)_2SO_3^\ominus$ | $(CH_2)_2SO_3Na$ | $SO_2(CH_2)_2SO_3Na$ | H | H | 1 |
| A-5 | O | O | " | " | $SO_2NH(CH_2)_2SO_3Na$ | H | H | 1 |
| A-6 | O | O | $(CH_2)_3CO_2^\ominus$ | $(CH_2)_3CO_2H$ | $O(CH_2)_3SO_3H$ | $SO_3H$ | $CH_3$ | 1 |
| A-7 | O | O | $(CH_2)_3SO_3^\ominus$ | $(CH_2)_3SO_3Na$ | $CONH(CH_2)_2SO_3Na$ | H | H | 1 |
| A-8 | O | O | $(CH_2)_3SO_3^\ominus$ | $(CH_2)_3SO_3K$ | H | $N(CH_2CH_2SO_3K)_2$ | H | 1 |
| A-9 | O | O | $C_2H_5$ | $C_2H_5$ | $SO_3Na$ | $SO_3Na$ | H | 1 |
| A-10 | O | O | $(CH_2)_4SO_3^\ominus$ | $(CH_2)_3SO_3Na$ | H | Cl | H | 1 |
| A-11 | O | O | $(CH_2)_4SO_3^\ominus$ | $(CH_2)_4SO_3H$ | $CO_2H$ | H | — | 0 |
| A-12 | O | O | " | " | H | $SO_3H$ | H | 2 |
| A-13 | O | O | " | $(CH_2)_4SO_3K$ | H | Cl | H | 3 |
| A-14 | S | S | $(CH_2)_3SO_3^\ominus$ | $(CH_2)_3SO_3Na$ | H | $CO_2Na$ | H | 1 |
| A-15 | S | S | " | " | $SO_3Na$ | H | $CH_3$ | 1 |
| A-16 | S | S | $(CH_2)_2SO_3^\ominus$ | $(CH_2)_2SO_3Na$ | $SO_2(CH_2)_2SO_3Na$ | Cl | H | 1 |
| A-17 | S | S | " | " | $CONH(CH_2)_2SO_3Na$ | H | H | 1 |
| A-18 | S | S | $(CH_2)_3CO_2^\ominus$ | $(CH_2)_3CO_2H$ | $O(CH_2)_3SO_3H$ | H | H | 1 |
| A-19 | S | S | $(CH_2)_4SO_3^\ominus$ | $(CH_2)_4SO_3K$ | H | Cl | H | 1 |

-continued

Formula (I)

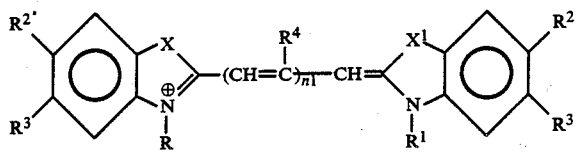

| Compound No. | X | X¹ | R | R¹ | R² | R³ | R⁴ | $n_1$ |
|---|---|---|---|---|---|---|---|---|
| A-20 | S | S | $(CH_2)_4SO_3^\ominus$ | $(CH_2)_4SO_3Na$ | H | $CO_2Na$ | — | 0 |
| A-21 | S | S | " | " | $SO_3Na$ | H | — | 0 |
| A-22 | S | S | $(CH_2)_2SO_3^\ominus$ | $(CH_2)_2SO_3Na$ | $CO_2Na$ | $CO_2Na$ | H | 2 |
| A-23 | S | S | $(CH_2)_2SO_3^\ominus$ | $(CH_2)_2SO_3Na$ | $SO_3Na$ | H | H | 2 |
| A-24 | O | S | $(CH_2)_3SO_3^\ominus$ | $(CH_2)_3SO_3H$ | $CO_2H$ | H | — | 0 |
| A-25 | O | S | " | " | $SO_3Na$ | H | H | 1 |
| A-26 | O | S | " | " | H | Cl | H | 1 |
| A-27 | O | S | " | $(CH_2)_4SO_3Na$ | H | $O(CH_2)_2SO_3Na$ | H | 1 |
| A-28 | O | S | " | " | H | $SO_3Na$ | H | 2 |
| A-29 | O | S | " | " | $SO_3Na$ | H | $CH_3$ | 2 |

Formula (II)

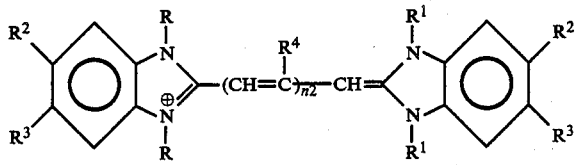

| Compound No. | R | R¹ | R² | R³ | R⁴ | $n_2$ |
|---|---|---|---|---|---|---|
| A-30 | $(CH_2)_3SO_3^\ominus$ | $CH_2SO_3Na$ | $CF_3$ | H | H | 1 |
| A-31 | " | " | H | Cl | H | 1 |
| A-32 | " | " | $(CH_2)_4SO_3Na$ | H | H | 1 |
| A-33 | " | $CH_2CO_2K$ | $(CH_2)_4SO_3K$ | $(CH_2)_4SO_3K$ | $CH_3$ | 1 |
| A-34 | " | $(CH_2)_3SO_3K$ | $CF_3$ | H | H | 1 |
| A-35 | " | " | $CO_2K$ | H | H | 2 |
| A-36 | " | $CH_2CO_2K$ | H | Cl | H | 2 |
| A-37 | " | $CH_2CO_2H$ | H | H | H | 3 |

Formula (III)

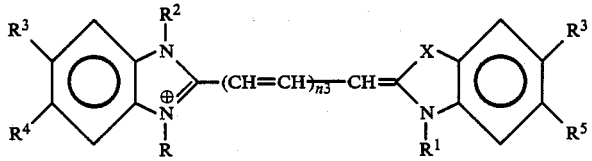

| | X | R | R¹ | R² | R³ | R⁴ | R⁵ | $n_3$ |
|---|---|---|---|---|---|---|---|---|
| A-38 | S | $(CH_2)_4SO_3^\ominus$ | $(CH_2)_4SO_3K$ | $CH_2CO_2K$ | H | $CF_3$ | $CO_2K$ | 1 |
| A-39 | S | " | " | $(CH_2)_4SO_3K$ | $CO_2K$ | H | $CO_2K$ | 1 |
| A-40 | S | " | " | " | H | $(CH_2)_4SO_3K$ | $O(CH_2)_2SO_3K$ | 1 |
| A-41 | S | " | $C_2H_5$ | " | H | $CH_2CO_2K$ | $CH_2CO_2K$ | 1 |
| A-42 | S | $(CH_2)_3SO_3^\ominus$ | $(CH_2)_3SO_3Na$ | $CH_2CO_2Na$ | H | $CF_3$ | $SO_3Na$ | 2 |
| A-43 | S | " | " | " | H | Cl | " | 0 |
| A-44 | O | " | " | $CH_2CO_2Na$ | H | Cl | $CO_2Na$ | 1 |
| A-45 | O | $(CH_2)_2SO_3^\ominus$ | $(CH_2)_2SO_3Na$ | $CH_2SO_3Na$ | H | Cl | " | 2 |
| A-46 | O | " | " | " | H | Cl | " | 3 |

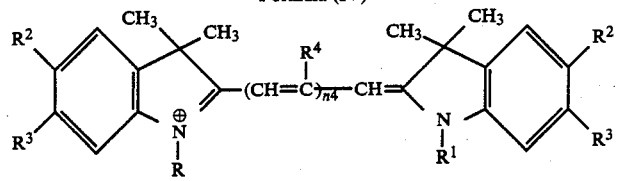

Formula (IV)

| Compound No. | R | $R^1$ | $R^2$ | $R^3$ | $R^4$ | $n_4$ |
|---|---|---|---|---|---|---|
| A-47 | $(CH_2)_4SO_3^\ominus$ | $(CH_2)_4SO_3K$ | $SO_3K$ | H | H | 1 |
| A-48 | " | $(CH_2)_4SO_3H$ | $SO_3H$ | H | H | 1 |
| A-49 | " | " | $CH_2CO_2K$ | H | H | 1 |
| A-50 | $(CH_2)_2O(CH_3)_3SO_3^\ominus$ | $(CH_2)_2O(CH_3)_3SO_3K$ | $SO_3K$ | H | H | 1 |
| A-51 | $(CH_2)_3SO_3^\ominus$ | $(CH_2)_3SO_3Na$ | $(CH_2)_2CO_2Na$ | H | H | 1 |
| A-52 | " | " | H | Cl | H | 1 |
| A-53 | $C_2H_5$ | $C_2H_5$ | " | $SO_3Na$ | H | 2 |
| A-54 | $(CH_2)_3SO_3^\ominus$ | $(CH_2)_3SO_3Na$ | $CO_2Na$ | H | H | 2 |
| A-55 | " | " | $CH_2CO_2Na$ | H | — | 0 |
| A-56 | $(CH_2)_2CO_2^\ominus$ | $(CH_2)_2CO_2Na$ | $SO_3Na$ | H | — | 0 |

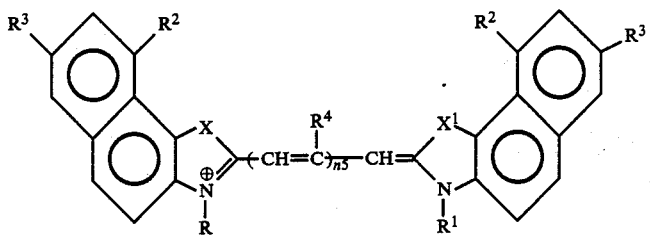

Formula (V)

| Compound No. | X | $X^1$ | R | $R^1$ | $R^2$ | $R^3$ | $R^4$ | $n_5$ |
|---|---|---|---|---|---|---|---|---|
| A-57 | O | O | $(CH_2)_3SO_3^\ominus$ | $(CH_2)_3SO_3Na$ | $SO_2Na$ | $SO_2Na$ | — | 0 |
| A-58 | O | O | " | " | " | " | $CH_3$ | 1 |
| A-59 | O | O | " | " | $CO_2Na$ | $CO_2Na$ | H | 2 |
| A-60 | S | S | $C_2H_5$ | $C_2H_5$ | $SO_3Na$ | $SO_3Na$ | H | 1 |
| A-61 | S | S | $CH_2CO_2^\ominus$ | $CH_2CO_2K$ | " | " | — | 0 |
| A-62 | O | S | $(CH_2)_4SO_3^\ominus$ | $(CH_2)_4SO_3K$ | " | " | H | 1 |
| A-63 | O | S | " | " | " | " | H | 2 |
| A-64 | $NCH_3$ | $NCH_3$ | " | " | " | " | H | 1 |
| A-65 | $NCH_3$ | S | " | " | " | " | H | 1 |
| A-66 | $NCH_3$ | O | " | " | " | " | H | 1 |

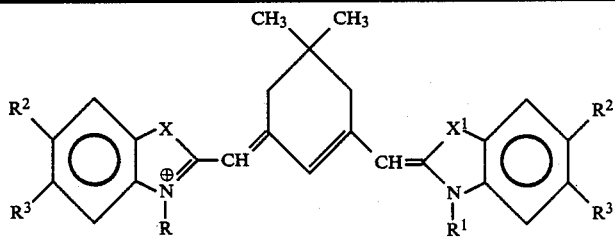

Formula (VI)

| Compound No. | X | $X^1$ | R | $R^1$ | $R^2$ | $R^3$ |
|---|---|---|---|---|---|---|
| A-67 | S | S | $(CH_2)_3SO_3^\ominus$ | $(CH_2)_3SO_3Na$ | $SO_2Na$ | H |
| A-68 | S | S | " | $(CH_2)_3SO_3K$ | $CO_2K$ | H |
| A-69 | S | O | " | " | H | $SO_3K$ |
| A-70 | S | O | " | " | $OCH_2SO_3K$ | H |

-continued
Formula (VI)
A-71
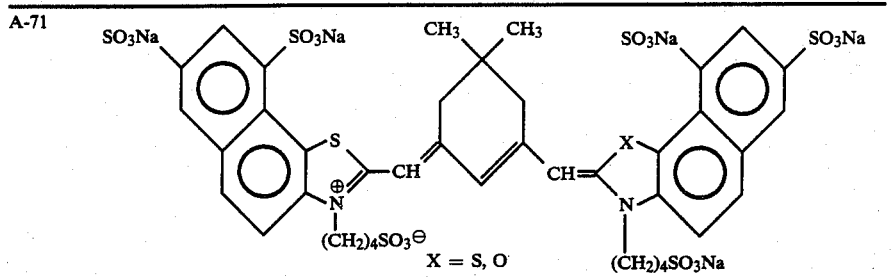
A-72
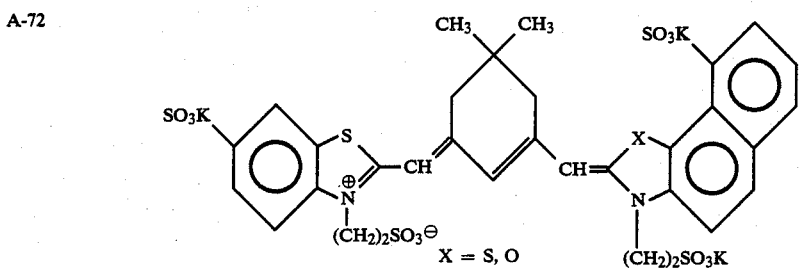
A-73
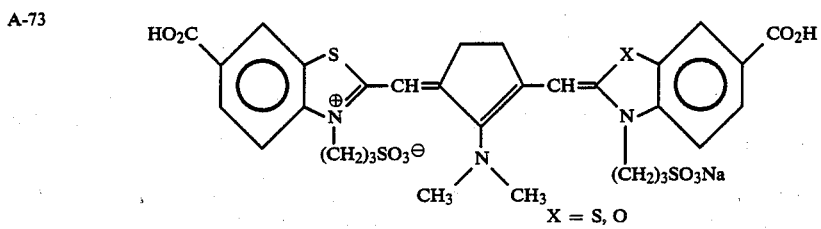
A-74
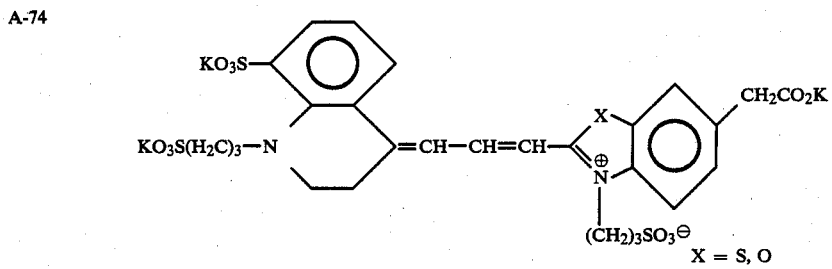
A-75
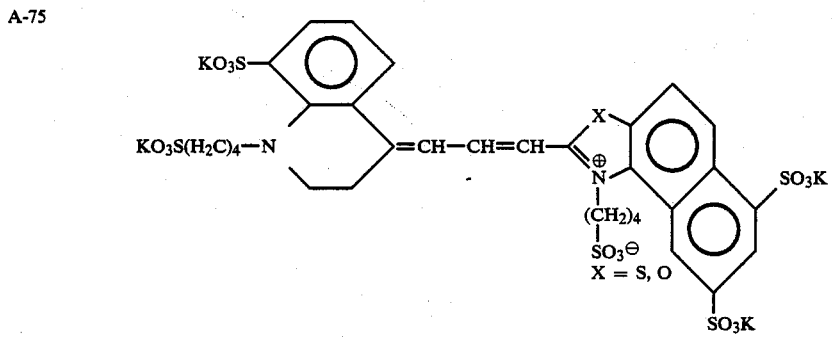
A-76
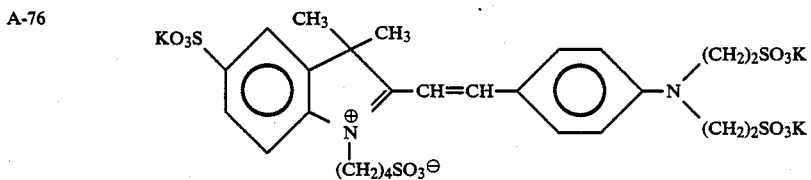
Of luminescent dyes used in the present invention, the above cyanine dyes can be synthesized iin known man-

Synthesis of Compound A-1

6.3 g of 4-(6-carboxy-2-methylbenzoxazolio-3)-butanesulfonate, 12 g of ethyl orthoformate, 18 ml of pyridine and 7 ml of acetic acid were weighed into a 100-ml flask with a stirrer, and were heated for 1.5 hours while stirring in an oil bath that had been heated to 140° C. Thereafter, the mixture was allowed to stand to cool and the separated crystals were filtered. The crystals were washed with acetone and then with methanol, and then were dissolved in a methanol to which triethylamine had been added. The undissolved matter was removed by filtration, a methanol solution of sodium iodide was added to the filtrate, the deposited crystals were filtered, and methanol was added thereto followed by washing with heating. The resulting crystals were dried under reduced pressure to produce the aimed product.

The yield: 4.11 g (58.5% of the theoretical yield); the melting point : 300° C. or higher; and $\lambda_{max}^{MeOH}=496$ nm ($\epsilon=1.32\times 10^5$).

Synthesis of Compound A-47

69 g of 4-(2,3,3-trimethyl-5-sulfo-3H-indolio-3)-butanesulfonate, 55 ml of ethyl orthoformate, 69 ml of acetic acid and 150 ml of pyridine were weighed into a 1-liter flask with a stirrer, and were heated for 1 hour with stirring in an oil bath that had been heated to 140° C. After cooling the reaction mixture to room temperature on standing, 400 ml of acetone were added to the reaction mixture, the supernatant was removed by decantation, and the residue was dissolved in 500 ml of methanol. A methanol solution of potassium acetate was added to the solution, and the mixture was heated for 10 min under reflux. The deposited crystals were filtered and washed with isopropanol. The crystals was recrystallized and washed using water and isopropanol repeatedly, and the resulting crystals were dried under reduced pressure to produce the desired product.

The yield: 41.2 ga (52.3% of the theoretical yield); the melting point: 300° C. or higher; and $\lambda_{max}^{MeOH}=555$ nm ($\epsilon=1.33\times 10^5$).

In a preferable use form of the present silver halide photosensitive materials, the photosensitive silver halide is in the form of a dispersion of tabular fine grains, the surface of the grains has an adsorption layer of a spectral sensitizing dye and the silver halide is optimally sensitized with the spectral sensitizing dye. Further, there are, on the outside of the adsorption layer of the spectral sensitizing dye, an adsorption layer of light-harvesting dye molecules and/or a medium of a hydrophilic colloid in which light-harvesting dye molecules are uniformly dispersed, which are integrated with the photosensitive silver halide to constitute a photosensitive element. In the case wherein a light-harvesting dye is dispersed in a medium of a hydrophilic colloid, the light-harvesting dye is present with most of the chromophoric groups not adsorbed directly on the photosensitive silver halide.

Of course, as one of various combinations, part of only one light-harvesting dye may be directly adsorbed on silver halide in one emulsion layer, and part of the light-harvesting dye may be dispersed in a hydrophilic medium thereby functioning both to transmit electrons to the silver halide and to collect light.

In the present photosensitive materials, the amount added of a light-harvesting dye is 2.0 mmol/dm³ or more, preferably 10 mmol/dm³ or more, and more preferably 20 mmol/dm³ or more, in terms of the concentration in the dry hydrophilic medium excluding the silver halide grain surface in the emulsion. Herein, the term "excluding the silver halide grain surface" means to exclude the species adsorbed on the silver halide grains including the sensitizing dyes. If the amount added is too high, the sensitization effect sometimes reaches a saturation point or decreases, so that in that sense it is preferable that the concentration is $10^{-1}$ mol/dm³ or less. Altrenatively the amount of a light-harvesting dye to be added in terms of the concentration per the total surface area of silver halide grains in the emulsion is 3.0 $\mu$mol/m² or more, preferably 3.5 $\mu$mol/m² or more, and more preferably 4.0 $\mu$mol/m² or more.

Although light-harvesting dyes used in the present invention may be used in combination, at lease part of the emission wavelength band of the light-harvesting dyes should overlap the optical absorption band of at lease one of sensitizing dyes adsorbed on a silver halide. The maximum emission wavelength of the light-harvesting dye that give the maximum luminescent to the longest wavelength among light-harvesting dyes used is preferably situated near the maximum absorption wavelength of the adsorbed sensitizing dye, to which energy is transmitted, among the adsorbed sensitizing dyes, and particularly desirably is situated within 60 nm, and more preferably within 30 nm, from the maximum absorption wavelength to the shorter wavelength side. For the Förster type energy movement it is preferable that the overlap between the absorption band and the emission band that are given by the light-harvesting dye itself in the medium is larger, and the difference between the maximum absorption wavelength and the maximum emission wavelength, that is, the so-called Stokes shift is preferably within 40 nm, and more preferably within 20 nm, of the medium.

The light-harvesting dyes used in the present invention can be used in combination with suitable surface active agents or other organic additives that act as a solubilizing agent or an association preventive agent.

In the present invention, the light-harventing dye contained in the hydrophilic colloid layer may be mordanted with a suitable cationic polymer or the like. For example, use can be made of polymers described in British Pat. No. 685,475, U.S. Pat. Nos. 2,675,316, 2,839,401, 2,882,156, 3,048,487, 3,184,309, and 3,445,231, West German patent application (OLS) No. 1,914,362, and Japanese patent application (OPI) Nos. 47624/75 and 71332/75.

It is preferable that the light-harvesting dyes used in the present invention can be removed quickly to the outside of the photosensitive material through development process or washing with water, or can be decomposed and bleached during the process, and more preferably the light-harvesting dyes are of the type that after removal they are decolored by hydrolysis or the like in an alkali processing liquid.

It is preferable that the light-harvesting dyes used in the present invention have a reduction potential of less than $-1.0$ V with respect to a saturated calomel reference electrode in a water/ethanol (volume ratio:1/1) solution. The method of measuring the reduction potential of dyes can be effected in accordance with the method described by Tadaaki Tani et al., in *Denki Kagaku*, Vol. 34, page 149 (1966).

As hydrophilic dispersion mediums that can be used in the emulsion layer or the intermediate layer of the photosensitive materials of the present invention, use can advantageously be made of gelatin, but other hydrophilic colloids can also be used. For example, use can be made of gelatin derivatives, graft polymers of gelatin with other polymers, and proteins such as casein and albumin; cellulose derivatives such as hydroxyethyl cellulose, carboxymethylcellulose and cellulose sulfate; sugar derivatives such as starch derivatives and sodium alginate; and various synthetic polymeric substances such as monopolymers and copolymers including polyvinyl alcohol, polyvinyl alcohol partial acetal, poly-N-vinyl pyrrolidone, polyacrylic acid, polymethacrylic acid, polyacrylamide, polyvinyl imidazole, and polyvinyl pyrazol.

As the gelatin, use can be made of lime-processed, general-purpose gelatin as well as acid-processed gelatin, enzyme-processed gelatin as described in *Bull. Soc. Sci. Phot. Japan*, No. 16, page 30 (1966), and gelatin hydrolysate.

In the present invention, at least one of emulsion layers containing luminescent light-harvesting dyes is coated with an emulsion comprising tabular grains having a diameter of an average projected area/average thickness ratio (aspect ratio) of 5/1 or more. Of tabular emulsions, preferable ones include emulsions described, for example, in Japanese patent application (OPI) Nos. 113926/83, 113927/83, 113928/83, 127921/83, and 99433/84.

Although the average thickness of the tabular silver halide grains is not critical the average thickness is preferably 0.3 $\mu$m or less, and more preferably 0.2 $\mu$m or less.

Although the average size of the tabular silver halide grains is not critical,the average size is preferably 2.0 $\mu$m or less, and more preferably 1.0 $\mu$m or less, in terms of the diameter of the corresponding sphere (the diameter of a sphere having the same volume). Although the grain size distribution may be wide or narrow, monodisperse grains having a narrow distribution are particularly preferable.

The silver halide grains may have a phase wherein the phase of the inside is different from the phase of the surface, or the grains may have a uniform phase. The grains may be those wherein a latent image is formed mainly on the surfaces, or those wherein a latent image is formed mainly in the insides of the grains. Grains wherein a latent image is formed mainly on the surfaces of the grains are preferable.

In the process of the formation or the physical ripening of the silver halide grains, a cadmium salt, a zinc salt, a lead salt, a thallium salt, an iridium salt or its complex salt, a rhodium salt or its complex salt, a iron salt or its complex salt, or the like may also be present.

Although the silver halide emulsion may be used without chemical sensitization, in other words, the silver halide emulsion may be used in the form of the so-called primitive emulsion, generally the silver halide emulsion is chemically sensitized in a conventional manner. To perform chemical sensitization, for example, method described by H. Frieser in *Die Grundlagen der Photographischen Prozesse mit Silberhalogeniden* (Akademische Verlagsgesellschaft, 1968), pages 675 to 734, can be employed.

That is, sulfur sensitization using active gelatin or a sulfur-containing compound capable of reacting with silver (e.g., thiosulfates, thioureas, mercapto compounds and rhodanines); reduction sensitization using a reducing substance (e.g., stannous salts, amines, hydraxine derivatives, formamidine sulfinic acid, and silane compounds); and noble metal sensitization using a noble metal compound (e.g. gold complex compounds and complex salts of metals of Group VIII of the Periodic Table such as Pt, Ir and. Pd) can be used alone or in combination. In the present invention, sulfur sensitization or the combination of sulfur sensitization and gold sensitization is particularly preferable.

The silver halide photographic emulsion used in the present invention may contain various compounds in order to prevent fogging during the process of the preparation, the storage or the photographic processing of the photographic material or in order to stabilize the photographic performance. That is, many compounds known as an antifoggant or a stabilizer such as axoles, for example, benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, and mercaptotetrazoles (particularly, 1-phenyl-5-mercaptotetrazole); mercaptrpyrimidines; mercaptotriazines; thioketo compounds such as oxadolinthione; azaindenes such as triazaindenes, tetraazaindenes (particularly, 4-hydroxy-substituted (1,2,3a,7)tetraazaindenes), and pentaazaindenes; benzenethiosulfonic acid, benzenesulfinic acid, and benzenesulfonamide can be added.

For the purpose of increasing sensitivity, or contrast or facilitating development, the photographic emulsion used in the present invention may contain, for example, polyalkylene oxides or their derivatives such as their ethers, esters or amines, thioether compounds, thiomorpholines, quaternary ammonium salt compounds, urethane derivatives, urea derivatives, imidazole derivatives, and 3-pyrazolidones.

Preferably the photosensitive silver halide used in the present invention are spectrally sensitized with an adsorbable spectral sensitizing dye. In this case, it is desirable that the surface coverage of the adsorbed dye is 20% or more, and more preferably 40% or more, of the amount of the saturation adsorption of the monolayer. When a sensitizing dye is used as a spectral sensitizing dye, there are negative photosensitive materials of the general surface latent image type and direct positive photosensitive materials wherein a latent image is formed in the inside. As a positive photosensitive material may be mentioned a positive photosensitive material of a type wherein the surface latent fog is broken under exposure to light using an electron accepting type dye to obtain a positive image. For the purpose of spectrally sensitizing the photosensitive material to the optimum state according to the use of the photosensitive material, an adsorbable supersensitizing agent or various other additives (e.g., antifoggants) may be used in addition to an adsorbable dye.

Adsorbable dyes used for spectral sensitization include cyanine dyes, merocyanine dyes, composite cyanine dyes, composite merocyanine dyes, allopolar cyanine dyes, hemicyanine dyes, styryl type dyes, hemioxonol type dyes, xanthene type dyes, triarylmethane type dyes, phenothiazine type dyes, acridine type dyes, and metal chelate compounds. Particularly useful dyes are dyes belonging to cyanine dyes, merocyanine dyes, and composite merocyanine dyes. In these dyes, anynucleus usually used for cyanine dyes can be applied as a basic heterocyclic ring nucleus. That is, a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nuclues, etc.; a nucleus formed by fusing an aliphatic hydrocarbon ring to any one of them; and a nucleus formed by fusing an aromatic hydrocarbon ring to any one of them such as an idolenine nucleus, a benzoindolenine nucleus, an indole nucleus, a benzaxazole nucleus, a naphthoxazole nuclesu, a benzothiazole nucleus, a naphthothiazole nucleus, a benzoselenazole nucleus, a benzimidazole nucleus, and a quinoline nucleus can be applied. These nuclei may be substituted on the carbon atoms thereof.

In the merocyanine dyes or composite merocyanine dyes, as a nucleus having a ketomethylene structure, a 5-to 6-membered heterocyclic nucleus can be applied, such as a pyrazoline-5-one nucleus, a thiohydantoin nucleus, a 2-thiooxazolidine-2,4-dione nucleus, a thiazolidine-2,4-dione nucleus, a rhodanine nucleus, and a thiobarbituric acid nucleus. Useful sensitizing dyes include dyes as described, for example, in German Pat. No. 929,080, U.S. Pat. Nos. 2,231,658, 2,493,748, 2,503,776, 2,519,001, 2,912,329, 3,656,959, 3,672,897, 3,694,217, 4,025,349, and 4,046,572, British Pat. No. 1,242,588 and Japanese Patent Publication Nos. 14030/69 and 24844/77.

These sensitizing dyes may be used alone or in combination, and the sensitizing dyes are often used in combination particularly for the purpose of supersensitization. Typical examples thereof are describes in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,827,862 and 4,026,707, British Pat. Nos. 1,344,281, and 1,507,803, Japanese Patent Publication Nos. 4936/68, and 12375/78, and Japanese patent application (OPI) Nos. 110618/77 and 109925/77.

The emulsion may contain, in addition to a sensitizing dye, a substance that itself neither has a spectral sensitizing effect nor absorbs visible light substantially, but which do exhibit supersensitization. For example, aminostilbene compounds substituted by a nitrogen-containing heterocyclic gouup (e.g., those described in U.S. Pat. Nos. 2,933,390 and 3,635,721), aromatic organic acid-formaldehyde condensates (e.g., those described in U.S. Pat. No. 3,743,510), cadmium salts and azaindene compounds may be contained. Combinations described in U.S. Pat. Nos. 3,615,613, 3,615,641, 3,617,295, and 3,635,721 are particularly useful.

When the present invention is applied to color photographic materials, various couplers can be used. Herein, the terminology "color couplers" means compounds capable of coupling with the oxidation product of an aromatic primary amine developing agent to produce a dye. Typical examples of useful color couplers include naphthol or phenol type compounds, pyrazolone or pyrazoloazole type compounds, and open chain or heterocyclic ketomethylene compounds. Specific examples of these cyan, magenta and yellow couplers that can be used in the present invention are described in *Research Disclosure,*, RD No. 17643 (Dec. 1978), section VII-D and *Research Disclosure*, RD No. 18717 (Nov. 1979).

To satisfy characteristics required for the photosensitive material, two or more couplers used in the present invention may be used in the same layer of the photosensitive layers or the same compound can be introduced into two or more layers.

To correct the undesired absorption in the short wavelength range possessed by the dye resulted from a magenta coupler or a cyan coupler, it is preferable that a colored coupler is additionally used in a color negative photosensitive material for photographing. As typical examples may be mentioned yellow-colored magenta couplers described, for example, in U.S. Pat. No. 4,163,670 and Japanese Patent Publication No. 39413/82 and magenta-colored cyan couplers described, for example, in U.S. Pat. Nos. 4,004,929 and 4,138,258 and British Pat. No. 1,146,368.

Couplers whose color-forming dye has a suitable diffusibility can be additionally used to improve the graininess. Typical examples of such blurring couplers include magenta couplers described in U.S. Pat. No. 4,366,237 and British Pat. No. 22,125,570 and yellow, magenta, or cyan couplers described in European Pat. No. 96,570 and West German Offenlegungschrift 3,234,533.

Dye-forming couplers and the above special couplers may form a dimer or higher polymer. Typical examples of polymerized dye-forming couplers are described in U.S. Pat. Nos. 3,451,1820 and 4,080,211. Specific examples of polymerized magenta couplers are described in British Pat. No. 2,102,173, U.S. Pat. No. 4,367,282, and Japanese patent application (OPI) Nos. 75041/85 and 113596/85.

Couplers that can release a photographically useful residue along with the coupling can also be preferably used in the present invention. As DIR couplers that can release a development inhibitor, couplers described in the above-mentioned RD No.17643, section IIV-F, are useful.

In the present photosensitive material, couplers that can release imagewise a nucleating agent or a development inhibitor or its precursor at the time of development can be used. Specific examples of such compounds are described in British Pat. Nos. 2,097,140 and 2,131,188. Couplers that can release a nucleating agent having an adsorption action on a silver halide are particularly preferable, and specific examples thereof are described in Japanese patent application (OPI) No. 157638/84 and 170840/84.

The photographic material according to the present invention may contain an inorganic or organic hardening agent in any hydrophilic colloid layer constituting a photographic layer or a back layer. Specific examples include chromium salts, aldehydes (e.g., forlmaldehyde, glyoxal, and glutaraldehyde), and N-methylol type compounds (e.g., dimethylol urea). Active halogen compounds (e.g., 2,4-dichloro-6-hydroxy-1,3,5-triazine), and active vinyl compounds (e.g., 1,3-bisvinylsulfonyl-2-propanol, 1,2-bisvinylsulfonylacetamidoethane or vinyl type polymers having vinylsulfonyl groups on the side chains) are preferable because they can harden hydrophilic colloids such as gelatin quickly, to provide stable photographic characteristics. N-carbamoyl pyridinium salts and haloamidinium salts are also excellent because the hardening can be quickened.

The silver halide emulsions used in the present invention can contain various other additives. That is, for example, surface active agents, thickening agents, dyes, ultraviolet absorber, antistatic agents, brighteners, desensitizers, developers, discoloration preventive agents, and mordants can be used.

These additives are particularly described, for example, in *Research Disclosure* RD No.17643, Vol. 176, pages 22 to 31 (December 1978) and in *The Theory of the Photographic Process*, 4th edition, edited by T. H. James (1977, Macmillan Publishing Co. Inc.).

In the photographic materials of the present invention, the photographic emulsion layers and other layers are applied on a conventional flexible support of plastic film, paper or cloth or a rigid support of glass, porcelain or metal. Useful flexible supports include films made of semisynthetic or synthetic polymers such as nitrocellulose, cellulose acetate, cellulose acetylate butyrate, polystyrene, polyvinyl chloride, polyethylene terephthalate, and polycarbonate and papers coated or laminated with a baryta layer or an α-olefin polymer (e.g., polyethylene, polypropylene and ethylene/butene copolymer). Supports may be colored with a dye or a pigment or may be made black for screening light. Generally the surface of supports is subjected to undercoat treatment to make adhesion to photographic layers or the like favorable. The support surface may be subjected to glow discharge, corona discharge, ultraviolet irradiation, flame treatment or the like before or after undercoat treatment.

Exposure to obtain a photographic image may be effected in usual manner. That is, any of various known light sources such as natural light (sunlight), a tungsten lamp, a fluorescent lamp, a mercury-arc lamp, a xenon-arc lamp, a carbon-arc lamp, a xenon-flash lamp, and a cathode ray tube flying spot can be used. Exposure time may be from 1/1000 sec to 1 sec that is used by usual cameras, or may be shorter than 1/1000 sec, and, for example, an exposure period of $1/10^4$ to $1/10^0$ sec using a xenon flash lamp, a cathode ray tube or a laser ray is possible or an exposure period longer than 1 sec can be used. The spectral composition of light used for exposure can be adjusted, if required, by using a color filter. Exposure may be effected by light emitted from a phosphor excited by electron rays, X-rays, γ-rays, α-rays or the like.

For the photographic processing of layers comprising photographic emulsions made according to the invention, any known methods and the known processing liquids described, for example, in *Research Disclosure* RD No. 176, pages 28 to 30 (RD-17643) can be applied. This photographic processing may be photographic processing for forming silver images (black and white photographic processing) or photographic processing for forming dye images (color photographic processing) according to the purpose. The processing temperature is usually selected form 18 to 50° C., but the processing temperature may be below 18° C. or over 50° C.

As a special type of development processing, a method can be used wherein a development agent is contained in a photosensitive material, for example, in an emulsion layer, and the photosensitive material is processed in an aqueous alkali solution to be developed. Hydrophobic development agents can be incorporated in emulsion layers by various methods described, for example, in *Research Disclosure* RD No. 169 (RD-16928), U.S. Pat. No. 2,739,890, British Pat. No. 813,253 and West German Pat. No. 1,547,763. Such development processing can be used in combination with a silver salt stabilizing process utilizing a thiocyanate.

Known fixer compositions can be used. As a fixing agent, thiosulfates and thiocyanates can be used, as well as organic sulfur compounds known as having a fixing effect. The fixer may contain a water-soluble aluminum salt as hardening agent.

Generally, a color developing solution comprises an aqueous alkaline solution containing a color developing agent. As a color developing agents, use can be made of known primary aromatic amine developers such as phenylenediamines (e.g., 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethyliniline, 3-methyl-4-amino-N-ethyl-N-β-methanesulfonamidoethylaniline, and 4-amino-3-methyl-N-ethyl-N-β-methoxyethylaniline).

Others described, for example, in *Photographic Processing Chemistry*, by L. F. A. Mason (Focal Press, 1966), pages 226 to 229, U.S. Pat. Nos. 22,193,015 and 2,592,364 and Japanese patent application (OPI) No. 64,933/73 can be used.

The color developing solution further can contain a pH buffer, development inhibitor, an antifoggant, and the like. If desired, the color developing solution can contain a water softener, a preservative, an organic solvent, a development accelerator, a dye-forming coupler, a competing coupler, a fogging agent, an auxiliary developer, a thickener, a polycaroxylic acid type chelate agent, an antioxidant, etc.

Specific examples of these additives are described, for example, in *Research Disclosure* No. RD-17643 as well as U.S. Pat. No. 4,083,723 and West German Offenlegungschrift (OLS) 2,622,950.

The photographic layers after the color development are generally bleached. The bleach processing may be carried simultaneously with the fixing processing, or may be carried out separately. As a bleaching agent, use can be made of compounds of polyvalent metals such as iron (III), cobalt (III), chromium (IV), and copper (II), and peracids, quinones, and nitroso compounds.

For examples, ferricyanides; dichromates; organic complex salts of iron (III) or cobalt (III) such as complex salts of aminopolycarboxylic acids, for example, ethylenediaminetetraacetic acid, nitrilotriacetic acid, and 1,3-diamino-2propanoltetraacetic acid or complex salts of organic acids such as citric acid, tartaric acid and malic acid with iron (III) or cobalt (III); persulfates, permanganates; and nitrosophenols can be used. Of these, potassium ferricyanide, iron (III) sodium ethylenediaminetetraacetate, and iron (III) ammonium ethylenediaminetetraacetate are particularly useful. Iron (III) ethylenediaminetetraacetate is useful both in a separate bleaching solution and in a combined bleach-fix solution.

Into the bleaching solution or the bleach-fix solution can be added bleach accelerators described, for example, in U.S. Pat. Nos. 3,042,520, and 3,241,966, Japanese Patent Publication Nos. 8506/70 and 8836/70, thiol compounds described in Japanese patent application (OPI) No. 65732/78, and other various additives.

In the processing of the present photosensitive materials, additives that can react with the light-harvesting dye can be added to the processing solutions such as the developing solution and the bleach-fix solution, and the photosensitive material is processed so that the light-harvesting dye added to the photosensitive material may be decomposed and decolored.

The present invention can be applied to various color photosensitive materials and black and white photosensitive materials. Typical examples are general-purpose or motion picture color negative films, color reversal films for slides and television, color reversal films for slides and television, color papers, color positive films, color reversal papers, color diffusion transfer type photosensitive materials, and heat-developable color photosensitive materials. The present invention can be applied to black and white photosensitive materials for X-rays by using three-color mixing described, for example, in *Research Disclosure* RD No. 17123 (July 1978) or by using black color forming couplers described, for example, in U.S. Pat. No. 4,126,461 and British Pat. No. 2,102,136. The present invention can also be applied to photoengraving films such as lith films and scanner films, direct and indirect medical and industrial X-ray films, black and white films for photographing, black-and-white photographic papers, COM or conventional microfilms, silver salt diffusion transfer type photosensitive materials, and printing-out type photosensitive materials.

The technique of the present invention is effective as means of improving spectrally sensitized sensitivity, and further because the light-harvesting dye in the dispersion medium also serves as a light absorbing agent, it is expected that the anti-irradiation effect and the antihalation effect due to the light-harvesting dye will improve the sharpness of the image of the photosensitive material as well as the sensitization. That is, although generally the use of irradiation preventive dyes and halation preventive dyes causes desensitization due simply to the light filtering effect, the present invention can improve sharpness without substantially decreasing the sensitivity while rather increasing the sensitivity, as the effect of light-harvesting dye working as an anti-irradiation and/or anti-hallation dye.

For example, in the case of a direct medical X-ray photosensitive material, both surfaces of the support of which are coated with emulsions, it is known that light of fluorescence transmitted from the fluorescence sensitized paper to the photosensitive layer on the side opposite to the incidence surface, that is, crossover light, significantly deteriorates the sharpness, but according to the present invention, it is expected that the amount of light absorption at the incidence surface is significantly increased, and due to the high sensitization and the screening of crossover light, the sharpness is significantly improved.

The invention is now described with reference to the following examples, but the invention is not limited to the examples.

EXAMPLE 1

To one liter of a 3% gelatin solution containing 50 mg of KI and 6.0 g of KBr were added with stirring 30 cc of an aqueous solution containing 5.0 g of $AgNO_3$ and 30 cc of an aqueous solution containing 3.4 g of KBr and 0.23 g of KI in the presence of a compound, $HO(CH_2)_2S(CH_2)_2.S(CH_2)_2S(CH_2)_2OH$, at 70° C. over 1 min by the double-jet simultaneous addition method. After the mixture was physically ripened for 20 min, 600 cc of an aqueous solution containing 95.0 g of $AgNO_3$ and 600 cc of an aqueous solution containing 63.0 g of KBr and 3.9 g of KI were added at a constant rate over 60 min thereto, to produce an emulsion (the silver content: 75 mg/g) containing tabular silver bromoiodide grains (iodide content: 4 mol %) with a diameter of an average projected area of 1.20 μm and an average thickness of 0.15 μm. The emulsion was optimally and chemically sensitized in the presence of chloroauric acid, sodium thiosulfate and a thiocyanate, then spectral sensitizing dye S-1 in an amount of 0.44 mmol/mol of Ag ($9 \times 10^{-7}$ mol/$m^2$ of the grain surface area) was added thereto, the emulsion was maintained for 10 min, and then as a stabilizer, 4-hydroxy-6methyl-1,3,3a,7-tetraazaindene in an amount of 8.6 mmol/mol of Ag was added thereto.

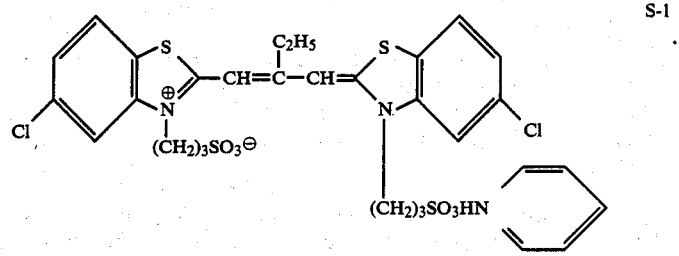

S-1

Then an aqueous solution of the present luminescent dye A-47 in a concentration of 0.05 mol/liter was added to the emulsion in an amount of from 0 to about 20 cc per 100 g of the emulsion to complete a tabular photosensitive coating emulsion.

The luminescence quantum yield of the luminescent dye A-47 was found to be about 0.8 by measuring at a concentration of $10^{-4}$ mol/$dm^2$ at 25° C. in dry gelatin. In the above-described adsorbability test using octahedral silver bromide grains with {111} planes, the amount of adsorption of A-47 was $10^{-8}$ mol/$m^2$ or less when the dye concentration of the solution phase was $10^{-4}$ mol/liter, and by the measurement by the dielectric loss method (T. Tani and S. Takada, *Phot. Sci. Eng.* Vol 18, 620 (1974)) it was confirmed that A-47 was substantially not adsorbed on the emulsion grains.

As a comparative emulsion, a gelatin emulsion (silver content: 75 mg/g) containing monodisperse octahedral silver bromide grains (iodide content: 4 mol %) 0.7 μm in diameter corresponding to a sphere was produced by adding to an aqueous gelatin solution an aqueous solution containing KBr and KI and an aqueous solution of $AgNO_3$ in the presence of ammonia by the double-jet adding method. After the emulsion was gold/sulfur-sensitized, a spectral sensitizing dye (s-1) solution in a concentration of $10^{-3}$ mol/liter was added in an amount of 16.3 cc per 100 g of the emulsion ($9 \times 10^{-7}$ mol/$m^2$ of the grain surface area) to the emulsion, and as a stabilizer, 4-hydroxy-6-methyl-1,3,3a,7-tetraazaindene in an amount of 30 mg per 100 g of the emulsion was added to spectrally sensitize. Similarly to the above tabular emulsion, the luminescent dye was added to the photosensitive emulsion obtained.

To the resulting tabular emulsion and the octahedron emulsion was added gelatin and usual coating assistants, and each of them was applied uniformly to a transparent, polyethylene terephthalate support such that the amount of silver might be 2.2 g/$m^2$ and the amount of gelatin might be 2.6 g/$m^2$, followed by drying thereby producing each photographic material.

Part of each of the samples was exposed for 1/100 sec to white light from a 1-kW tungsten lamp through a filter whose color temperature was 4800°K and an optical wedge, while the other part of each of the samples was exposed for 1/20 sec to monochromatic light through an interference filter of a wavelength of 540 nm wherein luminescent dye A-47 is involved in light absorption far greater in comparison to the absorption of sensitizing dye S-1, and they were developed at 20° C. for 10 min with a developing solution having a composition as set forth below to obtain silver negative images. In that processing, dye A-47 was completely washed out of the photosensitive material and removed.

| Composition of Developing Solution | |
|---|---|
| Metal | 2.5 g |
| L-ascorbic acid | 10.0 g |
| Nabox | 35.0 g |
| Potassium bromide | 1.0 g |
| Water to make | 1 liter |

The results of the photographic performances and the amounts of the dyes added to the samples are shown in Table 1. In Table 1, the relative sensitivities are given based on the reference (value: 100) of each of Sample I-1 and Sample I-7 which was the reciprocal number of the amount of exposure giving a density of (fogging density +0.2) in each system of the tabular grains and the octahedral grains.

TABLE 1

Light-harvesting and sensitizing effect on tabular grains and octaheadral grains

| | | Amount of dye added | | Relative Sensitivity | |
|---|---|---|---|---|---|
| | | Amount per unit grain surface area ($\mu$mol/m$^2$) | Amount in gelatin medium (mmol/dm$^3$) | | 540 |
| Sample No. | Emulsion | S-1 A-47 | A-47 | White | nm |
| I-1 (Comparison) | Tabular | 0.9 — | — | 100* | 100* |
| I-2 (Comparison) | " | " 0.20 | 1.0 | 100 | 107 |
| I-3 (Invention) | " | " 0.39 | 2.0 | 112 | 115 |
| I-4 (Invention) | " | " 1.97 | 10.0 | 129 | 145 |
| I-5 (Invention) | " | " 3.94 | 20.0 | 135 | 158 |
| I-6 (Invention) | " | " 5.91 | 30.0 | 138 | 160 |
| I-7 (Comparison) | Octahedral | 0.9 — | — | 100* | 100* |
| I-8 (Comparison) | " | " 0.38 | 1.0 | 100 | 100 |
| I-9 (Comparison) | " | " 0.77 | 2.0 | 109 | 115 |
| I-10 (Comparison) | " | " 3.84 | 10.0 | 120 | 129 |
| I-11 (Comparison) | " | " 7.68 | 20.0 | 125 | 141 |

Maximum absorption wavelength of S-1: 640 nm
Maximum absorption wavelength of A-47: 560 nm
*reference From the results, it is clear that by the addition of luminescent dye A-47, remarkable sensitization occurred in the light absorption range (540 nm) of A-47, and as a result the white light sensitivity was also improved. In comparison to the system using the octahedral grains, in the system using the tabular grains, the sensitization due to the luminescent dye was remarkable and at an equal concentration, a higher sensitivity was always obtained. As seen in the increase in the white light sensitivity when the concentration of luminescent dye A-47 in the gelatin binder was 2 mmol/dm$^3$ or more, the effect of the sensitization was remarkable. In each of Samples I-5 and I-6 wherein the amount of the luminescent dye per grain surface is more than 3 $\mu$mol/m$^2$, a maximum sensitivity was obtained for the amount.

Thus the fact that by adding a dye having a high luminescence yield into an emulsion layer in a concentration that was several times as high as the usual amount of a sensitizing dye, the spectral sensitizing sensitivity of a tabular emulsion was remarkable improved is an entirely new effect that has not been attained in the conventional technique for spectral sensitization by dyes and this effect had been attained only under the use conditions of a dye disclosed by the present invention.

EXAMPLE 2

To one liter of an aqueous 1.5 wt % gelatin solution containing 10.0 g of KBr were added with stirring 30 cc of an aqueous solution containing 1.8 g of AgNO$_3$ and 30 cc of an aqueous solution containing 1.3 g of KBr at 45° C. over 30 sec by the double-jet simultaneous adding method. After the temperature was raised to 75° C. followed by physical ripening, 200 cc of an aqueous solution containing 35.0 g of AgNO$_3$ and 200 cc of an aqueous solution containing 24.5 g of KBr simultaneously thereto over 15 min., with the flow rate progressively increased. Then, 300 cc of an aqueous solution containing 45.0 g of KBr and 4.4 g of KI and 300 cc of an aqueous solution containing 74.5 g of AgNO$_3$ were added to the emulsion over 25 min., with the flow rate again progessively increased. The pBr became approximately 1.6.

Sodium thiocyanate in an amount of 1.5 g/mol of Ag was added to the emulsion followed by ripening for 5 min. Then 100 cc of an aqueous solution containing 0.9 g of KI and 100 cc of an aqueous solution containing 9.0 g of AgNO$_3$ were added to the emulsion over 15 min. at a constant flow rate, thereby producing a tabular emulsion wherein tabular silver bromoiodide grains (iodide content: 6 mol %) having a diameter of an average projected area of 0.9 μm and an average thickness of 0.15 μm constituted 90% of all grains in terms of projected area.

After sensitizing dye S-1 in an amount of 0.62 mmol/mol of Ag was added to the emulsion at 40° C., and the emulsion was maintained for 20 min., the pAg was adjusted to 8.4. Then sodium thiosulfate and chloroauric acid were added to the emulsion optimally to chemically sensitize, and as a stabilizer, 4-hydroxy-6-methyl-1,3,3a,7-tetrazaindene in an amount of 10 mmol/mol of Ag was added to the emulsion.

Similarly to Example 1, luminescent dye A-47 used in the invention was added to the emulsion, and the emulsion was applied to a support such that the coating amount of silver was 2.2 g/m$^2$ and the coating amount of gelatin was 2.6 g/m$^2$, thereby producing a photographic material. The photosensitive material was exposed and developed in the same manner as in Example 1, and the results of the measured photographic sensitivity of the negative images are shown in Table 2. As in Example 1, with the addition of A-47, remarkable sensitization was observed in the light absorption range of the dye.

In this experiment, it was confirmed that dye A-47 was washed and removed completely out of the photographic material in the process of development.

TABLE 2

| | Light-harvesting and sensitizing effect on tabular grains | | | |
|---|---|---|---|---|
| | Amount of dye added | | | |
| | Amount per unit grain surface area (μmol/m$^2$) | Amount in gelatin medium (mmol/dm$^3$) | Relative Sensitivity | |
| Sample No. | S-1  A-47 | A-47 | White | 540 nm |
| I-1 (Comparison) | 1.2  — | — | 100* | 100* |
| I-2 (Invention) | ″  0.37 | 2.0 | 115 | 120 |
| I-3 | ″  1.85 | 10.0 | 130 | 155 |
| (Invention) I-4 (Invention) | ″  3.70 | 20.0 | 135 | 160 |

*Reference

EXAMPLE 3

Example 1 was repeated, except that instead of spectral sensitizing dye S-1, S-2 given below was added to the silver bromoiodide tabular grain emulsion produced in Example 1, and that instead of A-47, A-1 was added. The luminescence quantum yield of A-1 at a concentration of A-1 of 10$^{-4}$ mol/dm$^3$ at room temperature in dry gelatin was measured to be about 0.9. Similarly to A-47, A-1 was not adsorbed on silver halide grains at all either in a gelatin solution or in a dry film. The photographic sensitivity thus obtained is given in Table-3.

It is evident that when luminescent dye A-1 was added together with S-2, remarkable sensitization occurred at 500 nm (the maximum absorption wavelength of A-1 is around 505 nm) which was in the light absorption range of A-1, and as a result the white light sensitivity was improved. It is evident that that sensitization became remarkable when the concentration in the gelatin binder was 2 mmol/dm$^3$ or more and the sensitization was maximized when the amount per grain surface area was more than 3 μmol/m$^2$. Since sensitization occurred at the wavelength (475 nm) of the blue range up to 500 nm, it can be seen that when a luminescent dye as A-1 having an absorption in the blue range is used, as in this Example the sensitization in the blue range of a tabular emulsion can be improved with respect to spectral sensitization of the green range.

TABLE 3

| | Light-harvesting and sensitizing effect in the blue range in tabular grains | | | | |
|---|---|---|---|---|---|
| | Amount of dye added | | Relative Sensitivity | | |
| | Amount per unit grain surface area (μmol/m$^2$) | Amount in gelatin medium (mmol/dm$^3$) | | | 475 nm |
| Sample No. | S-2  A-1 | A-1 | White | 500 nm | (blue range) |
| I-1 (Comparison) | 0.9  — | — | 100* | 100* | 100* |
| I-2 (Comparison) | ″  0.20 | 1.0 | 100 | 105 | 105 |
| I-3 (Invention) | ″  0.39 | 2.0 | 115 | 130 | 115 |
| I-4 (Invention) | ″  1.97 | 10.0 | 135 | 185 | 135 |
| I-5 (Invention) | ″  3.94 | 20.0 | 149 | 195 | 142 |
| I-6 | ″  5.91 | 30.0 | 144 | 195 | 145 |

TABLE 3-continued
Light-harvesting and sensitizing effect in the blue range in tabular grains

| | Amount of dye added | | | Relative Sensitivity | |
|---|---|---|---|---|---|
| | Amount per unit grain surface area ($\mu$mol/m$^2$) | Amount in gelatin medium (mmol/dm$^3$) | | | 475 nm |
| Sample No. | S-2 | A-1 | A-1 White | 500 nm | (blue range) |
| (Invention) | | | | | |

*Reference

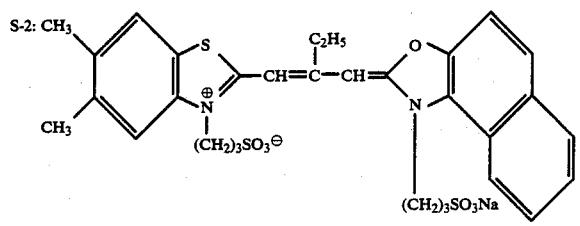

S-2:

Maximum absorption wavelength of S-2: 600 nm
Maximum absorption wavelength of A-1: 505 nm

EXAMPLE 4

Examples 1 and 3 were repeated, except that instead of luminescent dyes A-47 in Example 1 and A-1 in Example 3 of the invention, water-soluble dyes P-1 and P-2 that do not substantially give luminescence (having a luminescence quantum yield <0.05) were added respectively to the emulsions and the resulting emulsions were used for coating. The results of the photographic sensitivity are given in Table 4.

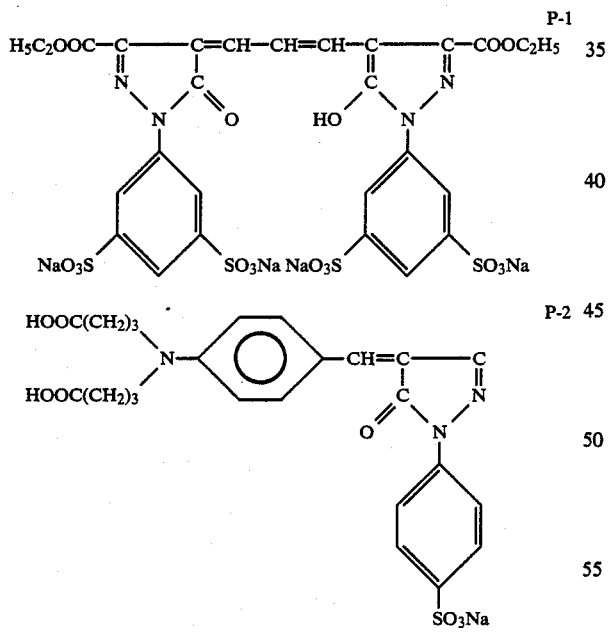

P-1

P-2

TABLE 4
Comparative experiment with nonluminescent dyes

| Sample No. | Sensi- tizing Dye | Comparative dye | | Relative Sensitivity | |
|---|---|---|---|---|---|
| | | Compound | Concent- ration in dry gelatin (mmol/dm$^2$) | White | 500 nm |
| I-1' | S-1 | — | — | 100* | 100* |
| IV-1 | " | P-1 | 10.0 | 80 | 60 |
| IV-2 | " | " | 30.0 | 70 | 45 |
| III-1' | S-2 | — | — | 100* | 100* |
| IV-3 | " | P-2 | 10.0 | 89 | 63 |
| IV-4 | " | " | 30.0 | 83 | 50 |

*Reference

Although P-1 and P-2 were water-soluble dyes and had absorption in the wavelength range approximately similar to those of A-47 and A-1, since they were poor in luminescence, their addition resulted in remarkable desensitization as seen from Table 4, and therefore it is evident that the luminescence of the dye to be added is essential in the present invention.

EXAMPLE 5

Example 1 was repeated, except that instead of luminescent dye A-47, an aqueous solution of xanthene type luminescent dye A given below was mixed with sodium dodecyl sulfate that was a surface active agent for dispersion and was added to the emulsion. The results of the photographic sensitivity are given in Table-5. The luminescence quantum yield of dye A in a gelatin dry film was about 0.7.

Luminescent dye A

-continued

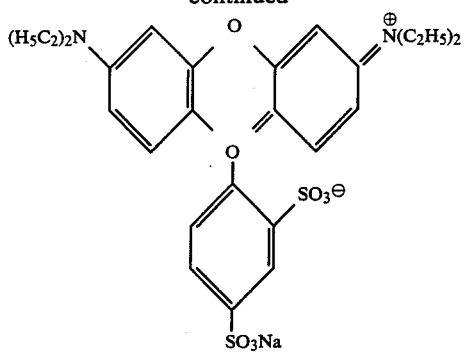

As is apparent from Table 5, it was shown that in comparison to sensitizing dye S-1, added luminescent dye A resulted in remarkable sensitization at 540 nm, which is included in the main absorption band of the dye A relating to a light-harvesting dye.

TABLE 5

| | Light-harvesting and sensitizing effect (xanthene type dye) | | | | |
|---|---|---|---|---|---|
| | Amount of dye added | | | | |
| | Amount per unit grain surface area ($\mu$mol/m$^2$) | | Amount in gelatin medium (mmol/dm$^3$) | Relative Sensitivity | |
| sample No. | S-1 | A | A | White | 540 nm |
| I-1 | 0.9 | — | — | 100* | 100* |
| IV-2 | " | 0.98 | 5 | 105 | 140 |
| IV-3 | " | 1.97 | 10 | 110 | 158 |
| IV-4 | " | 3.94 | 20 | 110 | 160 |

Maximum absorption wavelength of A: about 570 nm
*Reference

While the invention has been described in detail and with reference to specific embodiments thereof, it will be apparent to one skilled in the art that various changes and modifications can be made therein without departing from the spirit and scope thereof.

What is claimed is:

1. A silver halide photosensitive material comprising a support having thereon at least one silver halide emulsion layer comprising tabular grains whose diameter of an average projected area/average thickness ratio is 5/1 or higher, wherein said emulsion layer contains one or more luminescent dyes which absorb visible radiation and emit visible light whose luminescence quantum yield is 0.3 or more than the dye concentration in dry gelatin is $10^{-4}$ mol/dm$^3$ at room temperature and that can be substantially removed by development processing, and the content of said luminescent dye is 0.3 $\mu$mol/m$^2$ or more of the total surface area of the silver halide grains in said emulsion layer, or is 2.0 mmol/dm$^3$ or more in a hydrophilic dispersion medium excluding the silver halide grain surfaces in said emulsion layer and wherein said dye is substantially non-adsorbable, and the amount of adsorption of said luminescent dye is a 5 wt. % aqueous gelatin containing silver bromide whose outer surface comprises {111}planes is $5 \times 10^{-7}$ mol/m$^2$ or less at 40° C. and a pH of 6.5±0.05 under a solution phase dye concentration of $10^{-4}$ mol/liter.

2. A silver halide photosensitive material as in claim 1, wherein the luminescent dye dispersed in the emulsion layer of tabular grains is a water-soluble dye and the solubility in water of said luminescent dye is at least $10^{-2}$ mol/liter at 25° C. and a pH of 7.0.

3. A silver halide photosensitive material as in claim 1, wherein said tabular grains are spectrally sensitized with an adsorbable dye and the grain surface coverage of said adsorbable dye is 205 or more.

4. A silver halide photosensitive material as in claim 1, wherein the luminescence quantum yield of the luminescent dye is 0.5 or more when the dye concentration in dry gelatin is $10^{-4}$ mol/dm$^3$ at room temperature.

5. A silver halide photosensitive material as in claim 4, wherein the luminescence quantum yield is 0.7 or more.

6. A silver halide photosensitive material as in claim 1, wherein the content of said luminescent dye is 3.5 $\mu$mol/m$^2$ or more of the total surface area of the silver halide grains in said emulsion layer or is 10 mmol/dm$^3$ or more in the hydrophilic dispersion medium excluding the silver halide grain surface in said emulsion layer.

7. A silver halide photosensitive material as in claim 6, wherein the content of said luminescent dye is 4.0 $\mu$mol/m$^2$ or more of the total surface area of the silver halide grains in said emulsion layer or is 20 mmol/dm$^3$ or more in the hydrophilic dispersion medium excluding the silver halide grain surface in said emulsion layer.

8. A silver halide photosensitive material as in claim 1, wherein said luminescent dye is a water-soluble cyanine dye.

9. A silver halide photosensitive material as in claim 3, wherein said luminescent dye is a water-soluble cyanine dye.

10. A silver halide photosensitive material as in claim 1, wherein the emission band of at lease one luminescent dyes overlaps at least part of the absorption band of a dye directly adsorbed on the silver halide grain surface.

11. A silver halide photosensitive material as in claim 10, wherein the maximum absorption wavelength of said luminescent dye is from to 420 nm to 740 nm.

12. A silver halide photosensitive material as in claim 4, wherein the Stokes shift of said luminescent dye is not more than 20 nm at the dye concentration of $10^{-4}$ mol/dm$^3$ in dry gelatin at room temperature.

13. A silver halide photosensitive material as in claim 1, wheein the average thickness of the tabular grains is 0.3 $\mu$m or less.

14. A silver halide photosensitive material as in claim 1, wherein the average thickness of the tabular grains is 0.2 $\mu$m of less.

15. A silver halide photosensitive material as in claim 3, wherein the grain surface coverage of said adsorbable dye is 40% or more.

16. A silver halide photosensitive material as in claim 6, wherein said tabular grains are spectrally sensitized with an adsorbable dye whose grain surface coverage is 20% or more.

* * * * *